(12) United States Patent
Cotter et al.

(10) Patent No.: US 7,243,784 B2
(45) Date of Patent: Jul. 17, 2007

(54) ROLLER SHAFT MOUNT

(75) Inventors: David H Cotter, Coopersville, MI (US); Ryan D Tasma, Middleville, MI (US); Richard E Hoisington, II, Farmington, MI (US); Kenneth J Kooistra, Byron Center, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/159,796

(22) Filed: Jun. 23, 2005

(65) Prior Publication Data

US 2006/0000692 A1    Jan. 5, 2006

Related U.S. Application Data

(60) Provisional application No. 60/672,888, filed on Apr. 19, 2005, provisional application No. 60/585,311, filed on Jul. 2, 2004.

(51) Int. Cl.
    *B65G 21/00*    (2006.01)

(52) U.S. Cl. ............... 198/861.1; 198/844.2; 198/780; 198/782; 193/35 C; 193/35 J; 384/256; 384/258; 384/418; 384/419

(58) Field of Classification Search ............ 198/844.2, 198/861.1, 780, 782; 193/35 C, 35 J; 384/256, 384/258, 418, 419
    See application file for complete search history.

(56) References Cited

U.S. PATENT DOCUMENTS

| | | | |
|---|---|---|---|
| 736,905 A | 8/1903 | Willson, Jr. | |
| 1,047,490 A | * 12/1912 | Blakeslee | 384/256 |
| 2,828,852 A | 4/1958 | Lorig | |
| 3,255,865 A | 6/1966 | Sullivan | |
| 3,351,178 A | 11/1967 | Stone et al. | |
| 3,416,638 A | 12/1968 | Buck | |
| 3,763,992 A | 10/1973 | Klenk | |
| 4,096,942 A | 6/1978 | Shepherd | |
| 4,148,386 A | * 4/1979 | Bradbury | 193/37 |
| 4,226,608 A | 10/1980 | McKelvey | |
| 4,241,825 A | * 12/1980 | Brouwer | 198/782 |
| 4,278,166 A | 7/1981 | Pirro, Jr. | |

(Continued)

FOREIGN PATENT DOCUMENTS

| | | |
|---|---|---|
| EP | 0 423 415 A1 | 4/1991 |
| GB | 827002 | 1/1960 |
| GB | 843117 | 8/1960 |
| GB | 2204294 A * | 11/1988 |

*Primary Examiner*—Gene O. Crawford
*Assistant Examiner*—Leslie A. Nicholson, III
(74) *Attorney, Agent, or Firm*—Van Dyke, Gardner, Linn & Burkhart, LLP

(57) ABSTRACT

A roller shaft mount or support secures a shaft end of a conveyor roller at and between opposite sidewalls of a conveyor. The shaft support includes a mounting portion mountable to a sidewall of the conveyor and a clamping portion. The clamping portion is movably attached to the mounting portion and movable relative thereto. The shaft support receives a roller shaft at least partially therethrough. The clamping portion is movable relative to the mounting portion so as to clamp the roller shaft within the shaft support in response to movement of the clamping portion relative to the mounting portion. The clamping portion may move along a ramped surface toward and into engagement with the shaft of the roller in response to adjustment of a fastener to clamp the roller shaft within the shaft support.

21 Claims, 12 Drawing Sheets

U.S. PATENT DOCUMENTS

| | | |
|---|---|---|
| 4,311,226 A | 1/1982 | Thompson et al. |
| 4,632,575 A * | 12/1986 | Alverth et al. ............... 384/258 |
| 4,787,504 A | 11/1988 | Schultz |
| 4,832,184 A | 5/1989 | DeGood |
| 4,872,246 A | 10/1989 | Yano |
| 4,885,059 A | 12/1989 | Marx, Jr. |
| 4,887,707 A | 12/1989 | Harms |
| 4,905,817 A | 3/1990 | Limbach et al. |
| 5,048,661 A * | 9/1991 | Toye ....................... 193/35 R |
| 5,127,513 A | 7/1992 | Huber |
| 5,582,286 A | 12/1996 | Kalm et al. |
| 5,657,854 A | 8/1997 | Chen et al. |
| 5,875,878 A | 3/1999 | Pierson |
| 5,901,830 A | 5/1999 | Kalm et al. |
| 5,906,268 A | 5/1999 | Kalm |
| 5,921,370 A | 7/1999 | Plesh, Sr. |
| 5,964,338 A | 10/1999 | Schroader |
| 6,161,681 A | 12/2000 | Kalm |
| 6,302,255 B1 * | 10/2001 | Hollander ................. 193/35 R |
| 6,367,617 B1 | 4/2002 | Schiesser et al. |
| 6,685,008 B2 | 2/2004 | Schiesser et al. |
| 6,726,003 B2 | 4/2004 | Itoh et al. |
| 2002/0060139 A1 * | 5/2002 | Schiesser et al. ............ 198/782 |

\* cited by examiner

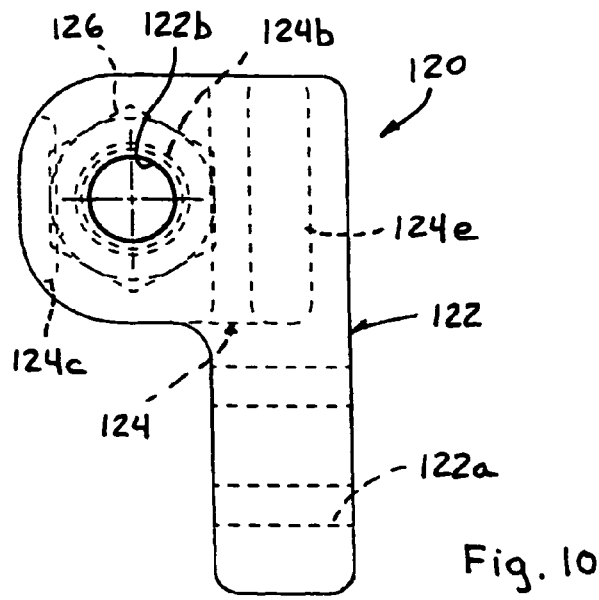
Fig. 10
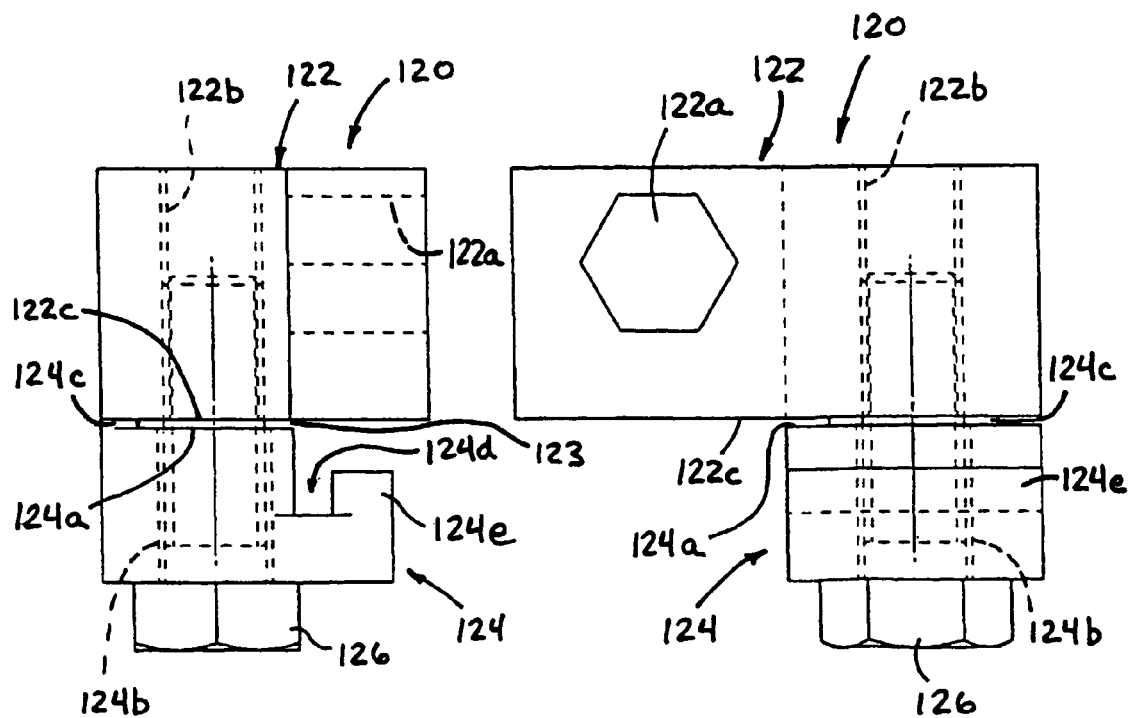
Fig. 8
Fig. 9

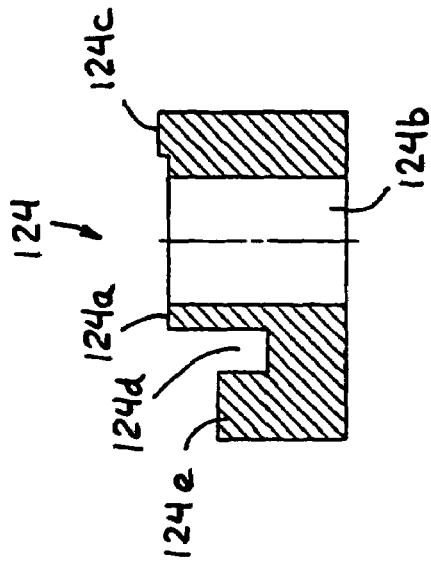
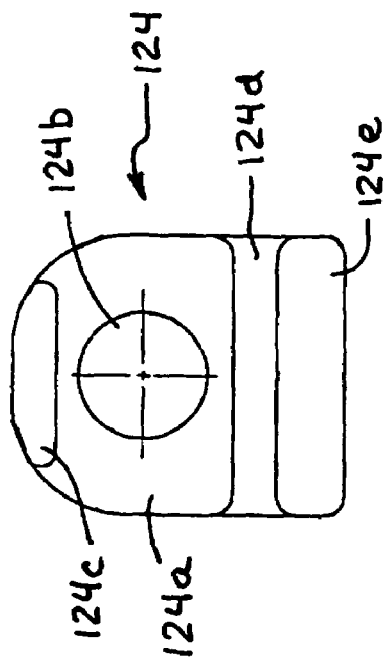
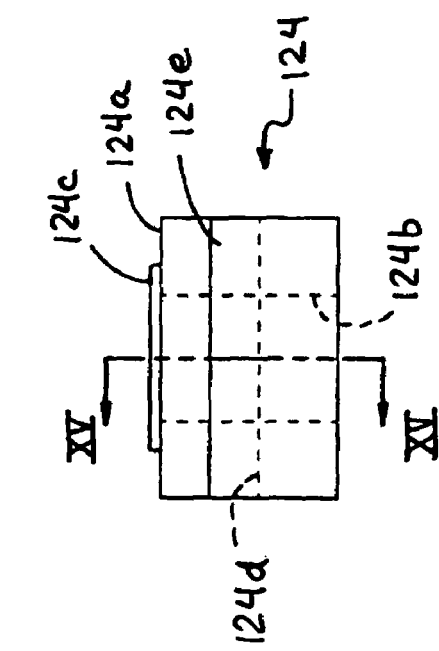

ROLLER SHAFT MOUNT

CROSS REFERENCE TO RELATED APPLICATIONS

The present application claims benefit of U.S. provisional applications, Ser. No. 60/585,311, filed Jul. 2, 2004; and Ser. No. 60/672,888, filed Apr. 19, 2005, which are hereby incorporated herein by reference in their entireties.

FIELD OF THE INVENTION

The present invention relates generally to conveyor rollers for conveying products along a conveyor and, more particularly, to a mounting structure for mounting the rollers to the sidewalls of the conveyor. Although the roller shaft mount of the present invention is particularly suited for mounting self-driven or motorized rollers to the sidewalls of a conveyor, it may be used with non-driven or non-motorized rollers, such as freely rotating rollers or rollers that are slaved to motorized rollers, or rollers that are driven from beneath, such as by a belt or padded chain or the like.

BACKGROUND OF THE INVENTION

Typically, conveyor rollers are mounted along opposite sidewalls of a conveyor. The rollers include shafts which extend longitudinally outwardly from each end of the roller and which are received by apertures or slots in the sidewalls of the conveyor. These shafts are often non-circular, such as hexagonal shaped, such that rotation of the shafts relative to the sidewalls is substantially precluded when the shaft is received by a correspondingly shaped slot or hole in the sidewall.

A motorized roller typically includes a motor within the cylindrical portion of the roller, which causes relative rotation between the shaft portions and the cylindrical portion of the roller. Accordingly, when the shafts are secured to the sidewall of the conveyor, actuation of the motor within the roller causes the cylindrical portion of the roller to rotate. Because of the torque generated when the motorized roller is actuated, the shaft, which is submitted to the same torque, tends to rotate in the opposite direction from the cylindrical portion of the roller, such that the sides of the non-circular shaft repeatedly impact the sides of the corresponding slot or hole in the sidewall, thereby preventing rotation of the shaft. This repeated impact and relative movement may cause the edges of the shaft or of the hole or both to become worn or rounded over time, which leads to a looser fit of the shaft within the opening. Any looseness between the shaft and opening further results in squeaks or other noises and/or vibrations of the conveyor when it is operated. This eventually may result in greater maintenance costs and even loss of function, since the roller and/or the entire sidewall may have to be replaced when the wear and tear to the shaft and/or the opening in the sidewalls becomes excessive. Motorized rollers are typically implemented with a set of non-driven or slave rollers and may be interconnected with the slave rollers by a plurality of bands or O-rings, such that rotation of the cylindrical portion of the motorized roller causes a corresponding rotation of the slave rollers.

Because of the torque generated by the motorized rollers, it is generally preferred that the shafts be inserted through openings or holes and not placed into slots whereby only a portion of the sidewall would contact and restrain the shafts. The openings in the sidewalls are desired to be as close to the diameter of the shaft of the roller to provide as tight a fit as possible between the roller shaft and the sidewall opening. However, such a tight fit may make it difficult to install the roller to the sidewalls. In some applications, the shafts may be spring loaded, such that the shaft may be pushed longitudinally inwardly into the roller to align the roller shaft with the opening in the conveyor sidewall and then released to allow the shaft to extend outwardly through the opening, thereby securing the shaft to the conveyor sidewalls.

In order to improve upon the wear and tear and noise of the systems, one proposed device has implemented a tapered end to the shafts of the roller. When the tapered shafts are released, the spring loading of the shafts maintains a tight fit in the opening, since the opening is of a smaller size than the largest diameter of the tapered portion of the shaft. While this at least initially provides for a tighter fit between the roller shaft and the opening in the sidewall of the conveyor, over time the shaft and/or opening may wear and allow the shaft to extend further into the opening. The shaft may eventually extend outwardly to a point where the spring is no longer in compression, such that the shaft is no longer held tight to the opening in the sidewall. Therefore, while this device may delay a loose fit of the shaft within the openings, this does not avoid the requirement of eventually having to replace or repair the sidewalls of the conveyor and/or the roller as they become worn.

Therefore, there is a need in the art for an adjustable mounting structure for receiving and substantially securing the shaft ends of conveyor rollers, especially motorized conveyor rollers, which overcomes the shortcomings of the prior art.

SUMMARY OF THE INVENTION

The present invention provides a mounting structure or shaft mount or support for receiving the shaft ends of a conveyor roller and mounting the roller to the sidewalls of a conveyor assembly. The present invention is able to tightly grip or clamp onto the shaft ends of a roller and limit or substantially preclude rotation of or impact by the shafts within the openings in the sidewalls of the conveyor. The present invention thus provides an increased life cycle for the sidewalls of the conveyor.

According to an aspect of the present invention, a roller shaft mount or shaft support secures a shaft end of a conveyor roller that extends laterally across a conveyor, which has opposite sidewalls extending generally along a direction of conveyance. The shaft support includes a mounting portion mountable to a sidewall of the conveyor and a clamping portion. The clamping portion is movably attached to the mounting portion and movable relative thereto. The shaft support receives a roller shaft or axle at least partially therethrough. The clamping portion is movable relative to the mounting portion so as to clamp the roller shaft within the shaft support in response to movement of the clamping portion relative to the mounting portion.

The shaft support may include a fastener that connects the mounting portion to the clamping portion, such that adjustment of the fastener adjusts the clamping portion relative to the mounting portion and thus adjusts the clamping forces exerted on the roller shaft. In one form, the clamping portion may move along a ramp or ramped surface toward and into engagement with the shaft of the roller in response to adjustment of the fastener to clamp the roller shaft within the shaft support. The mounting portion may include a shaft receiving aperture therethrough for receiving the roller shaft. The clamping portion may be shaped to correspond to a portion of the shaft receiving aperture to engage a portion of the roller shaft that protrudes from the shaft receiving aperture. The ramped surface may be at an angle between approximately ten degrees and approximately twenty degrees from an axis of the shaft receiving aperture.

In another form, the clamping portion may be twisted or rotated or pivoted relative to the mounting portion in response to adjustment of the fastener to clamp the roller shaft within the shaft receiving portion. The shaft receiving portion may be pivotable relative to the mounting portion about an axis of rotation which is generally normal to a longitudinal axis of the roller shaft. In another form, the shaft support is adjustably mounted to the sidewall of the conveyor via a fastener, whereby adjustment of the fastener causes twisting or pivot movement of the shaft receiving portion relative to the sidewall so as to clamp the roller shaft within an opening at least partially through the shaft receiving portion.

According to another aspect of the present invention, a roller conveyor includes a pair of opposite sidewalls defining shaft openings, at least one roller and at least one roller shaft mount or support. The roller comprises a shaft portion extending longitudinally outwardly from each end, and a generally cylindrical roller surface that rotates relative to the shaft portions. The roller may comprise a motorized roller, and thus may include an internal motor for rotating or rotatably driving the roller surface relative to the shaft portions. The shaft support is adaptable to receive a shaft portion of the roller to mount and secure the shaft portion to a sidewall of the conveyor. The shaft support is movable or adjustable to clamp the shaft portion within the shaft support to substantially preclude rotation of the shaft portion relative to the shaft support.

Preferably, the shaft portion of the roller is received through the shaft opening in the sidewall and at least partially through the shaft support. At least a portion of the shaft support moves or slides or pivots or rotates relative to the sidewall to clamp the shaft portion within the shaft support. Optionally, the shaft or axle portion may be inserted through the shaft support and through the sidewall and into an opening in the roller.

According to another aspect of the present invention, a method of securing a shaft or axle of a motorized roller to a sidewall of a conveyor includes providing a conveyor section having opposite sidewalls and providing a roller shaft mount or support having a mounting portion and a clamping portion. The shaft support is mounted at a sidewall of the conveyor. A shaft or axle of a roller is inserted through the shaft receiving aperture of the sidewall and at least partially through the shaft receiving aperture of the shaft support. The clamping portion is moved relative to the mounting portion to clamp the roller shaft in the shaft receiving aperture.

The clamping portion may be moved via adjusting a fastener of the shaft support. The clamping portion may be moved along a ramped surface of the mounting portion to move the clamping portion toward and into engagement with the roller shaft. Optionally, the clamping portion may be pivoted relative to the mounting portion via adjusting a fastener of the shaft support.

According to another aspect of the present invention, a conveyor system comprises opposite side channels, a plurality of rollers rotatably supported at opposite ends at the side channels, and a cantilevered axle assembly supporting at least one end of one of the rollers in a cantilevered manner from one of the side channels. The cantilevered axle assembly includes at least one stub axle that inserts through an opening in one of the side channels and at least partially penetrates a passageway at the end of the roller.

The shaft support cantileverly supports the stub axle from the respective side channel. The end of the stub axle that partially penetrates the end of the roller may have a narrowed end portion having a narrowing cross section toward a tip of the stub axle.

Therefore, the present invention provides a shaft support which non-rotatably secures the shaft portions of a driven or non-driven roller. The shaft support may be implemented with a conventional or known roller having a spring-loaded shaft, or may be implemented with other rollers which do not include spring-loaded shafts, but which may be loosely inserted through the openings in the conveyor sidewalls and then clamped within the shaft supports and openings. The present invention thus provides a roller and shaft support which are easier to install on and remove from the sidewalls of a roller conveyor. Because the roller shaft is clamped or secured within the shaft supports, the present invention reduces wear at the sidewalls of the conveyor.

These and other objects, advantages, purposes and features of the present invention will become apparent upon review of the following specification in conjunction with the drawings.

BRIEF DESCRIPTION OF THE DRAWINGS

FIG. 8 is an end elevation of the shaft support of FIGS. 6 and 7;

FIG. 9 is a side elevation of the shaft support of FIGS. 6–8;

FIG. 10 is a plan view of the shaft support of FIGS. 6–9;

FIG. 13 is a side elevation of a mounting portion of the shaft support of FIGS. 6–10;

FIG. 14 is a plan view of the mounting portion of FIG. 13;

FIG. 15 is a sectional view of the mounting portion of the shaft support taken along the line XV—XV in FIG. 13;

DESCRIPTION OF THE PREFERRED EMBODIMENTS

Figure 1:
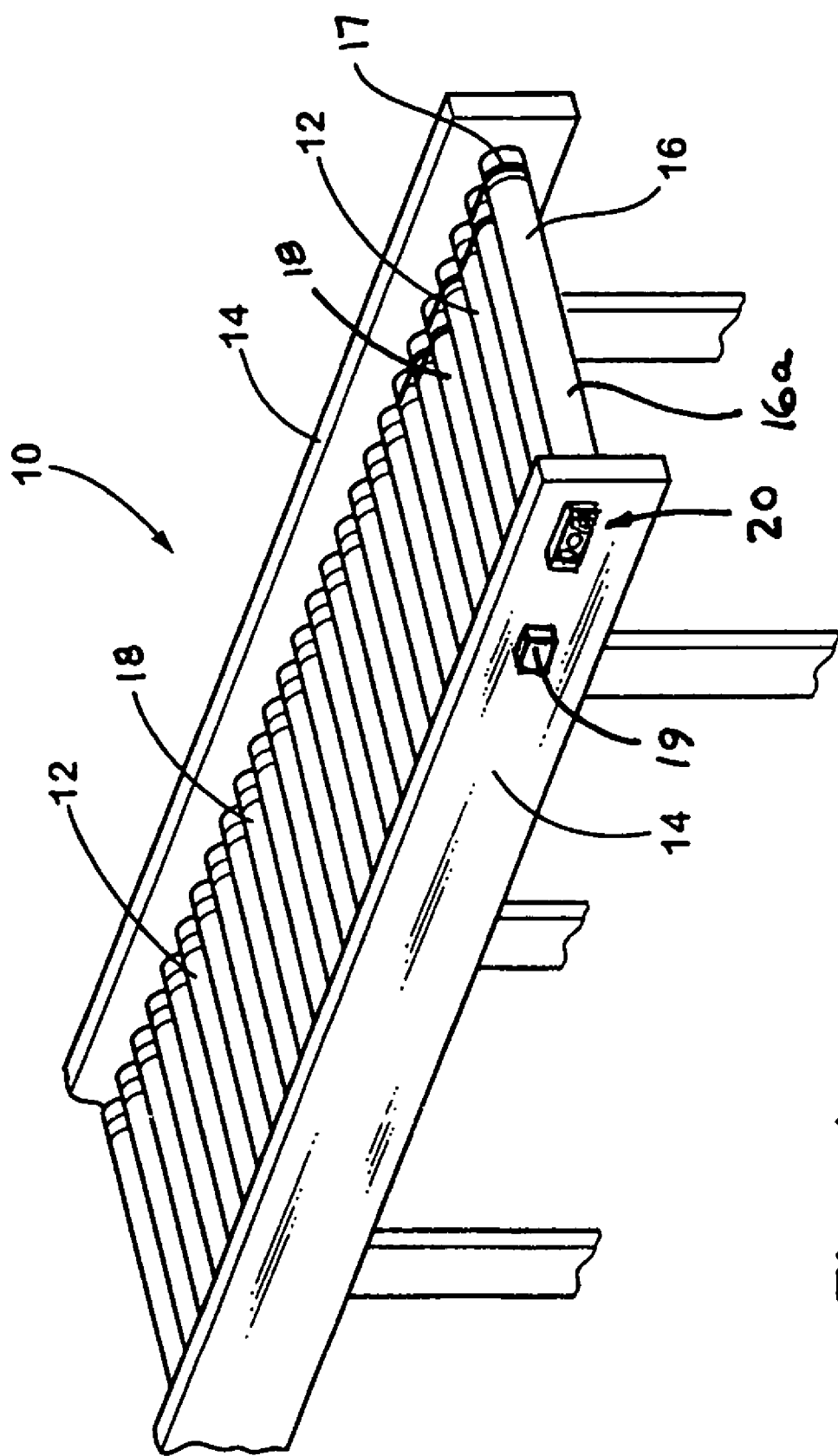
FIG. 1 is a perspective view of a section of a conveyor having a shaft support mounted at a sidewall of the conveyor in accordance with the present invention.

Referring now specifically to the drawings and the illustrative embodiments depicted therein, a roller conveyor or conveyor bed or system 10 comprises a plurality of generally cylindrical rollers 12 rotatably mounted between a pair of substantially parallel opposite sidewalls 14 (FIG. 1). Typically, the conveyor 10 is divided into separate sections or zones, such that at least one roller within each section is a driven, motorized roller 16 positioned among or at an end of a group of non-driven or slave rollers 18. Driven roller 16 may be interconnected to the slave rollers by a plurality of drive members or bands or belts or O-rings 17, such that rotation of the driven roller 16 causes a corresponding rotation of the slave rollers 18, as is known in the conveyor art. A control 19 functions to actuate/deactuate and control driven roller 16 to convey articles along conveyor 10, as is also known in the art. The axles or shaft ends of the rollers, and particularly of the motorized rollers 16 of the conveyor 10 are received within corresponding roller shaft mounts or shaft supports 20 mounted to the sidewalls 14 of the conveyor, whereby the shaft supports 20 function to clamp or otherwise tightly secure the shaft ends therewithin, as discussed below. The shaft supports 20 thus may substantially secure the shaft ends of the motorized rollers and/or the idler or slave rollers of the conveyor to the sidewalls or side channels of the conveyor.

Each roller 12 comprises a substantially cylindrical roller portion and an axle or shaft extending longitudinally outwardly at each end of the roller. The roller portion may rotate around a pair of non-rotatable portions or cartridges or shaft portions at opposite ends of the roller, such as via a bearing or the like between the shaft portions and the roller portion. The shaft portion includes the axle or shaft or stub axle, which protrudes outwardly from the shaft portion. The shaft portion may comprise a cartridge or stub axle assembly, or may otherwise non-rotatably receive the axle therein, and may receive a stub axle that is inserted into an opening of the shaft portion (as discussed below) to non-rotatably mount the shaft portion of the roller to the sidewall or side channel of the conveyor. The cartridge or stub axle assembly may include a motor for a motorized roller or a braking device or the like, such as described in U.S. Pat. Nos. 6,782,996 and/or 6,868,961, and/or U.S. patent application, Ser. No. 10/993, 301, filed Nov. 19, 2004 by Haan et al. for CONVEYOR ROLLER WITH BRAKE, now U.S. Pat. No. 7,021,456, which are hereby incorporated herein by reference.

Self-driven or motorized roller 16 may be a motorized roller which has a motor within the roller that functions to rotate cylindrical portion 16a relative to the shaft portion and axle 16b. For example, motorized roller 16 may be of the type commercially available from various sources, such as a 12 Volt DC or 24 Volt DC motorized roller or the like. For example, the motorized roller may comprise a DC motorized roller, such as a 12 volt DC motorized roller or the like, such as a roller of the type disclosed in U.S. Pat. No. 6,244,427, the disclosure of which is hereby incorporated herein by reference. Optionally, the motorized roller may comprise a 24 volt DC motorized roller or a 42 volt DC motorized roller or a 48 volt DC motorized roller or the like. For example, the motorized roller may comprise a 48 volt DC motorized roller (or a 24 volt DC motorized roller) having a diameter of approximately 50 mm and an overall width of between 450 mm and 900 mm. The 48 volt DC motorized roller may comprise a DC brushless motor and may be operable at speeds between approximately 130 rpm and 1150 rpm and may provide an output of approximately 3 Nm of torque at approximately 400 rpm and approximately 1.5 Nm of torque at approximately 1150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller portion directly, such as disclosed in U.S. Pat. No. 6,244,427, or may drive the roller via a gear train or the like, such as disclosed in U.S. Pat. No. 5,442,248, the disclosures of which are hereby incorporated herein by reference.

Conveyor or conveyor section 10 may comprise any type of roller conveyor, such as a roller conveyor utilizing aspects of the roller conveyors described in U.S. Pat. Nos. 6,253, 909; 6,782,996 and/or 6,868,961, and/or in U.S. patent applications Ser. No. 10/764,933, filed Jan. 26, 2004 by Bigelow et al. for CONVEYOR BED EMERGENCY STOP, now U.S. Pat. No. 6,883,660; Ser. No. 10/907,929, filed Apr. 21, 2005 by Anderson et al. for NETWORK TOPOLOGY DISCOVERY; and/or Ser. No. 10/993,301, filed Nov. 19, 2004 by Haan et al. for CONVEYOR ROLLER WITH BRAKE, now U.S. Pat. No. 7,021,456, which are all hereby incorporated herein by reference.

Accordingly, when the axles and shaft portions of the roller are substantially fixed or non-rotatable at the sidewalls of the conveyor or conveyor section, actuation of the motorized roller 16 causes rotation of cylindrical portion 16a about the shaft portion and axle 16b, which subsequently causes rotation of the cylindrical portions of the slave rollers 18, such as via bands or O-rings 17, to convey product along the conveyor 10. However, motorized roller 16 may be driven and may correspondingly drive the other rollers by any known means, without affecting the scope of the present invention. Generally, the axles or shafts are formed in a non-circular shape, such that insertion of the axle or shaft into a correspondingly shaped slot or aperture in sidewalls 14 and/or shaft support 20 substantially precludes relative rotation therebetween. Preferably, the axle or shaft and corresponding apertures are cross sectionally hexagonal-shaped, although other shapes or locking means, such as set screws or pins, may be implemented without affecting the scope of the present invention.

Figure 5:
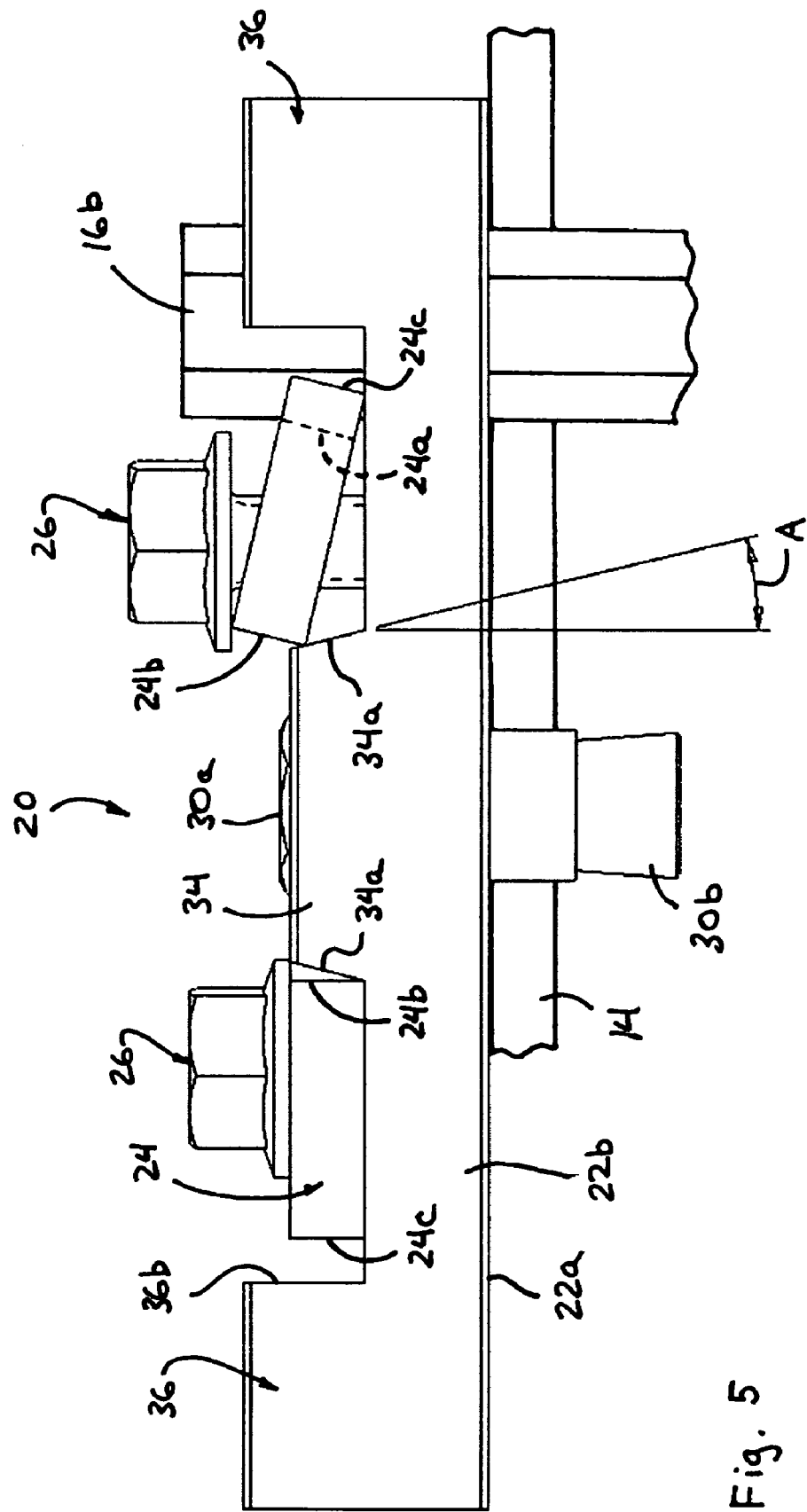
FIG. 5 is a side elevation of the assembled shaft support of FIG. 4.

Each sidewall 14 of conveyor 10 may have a plurality of hexagonal shaped apertures or openings therethrough for receiving the axles of the rollers. As best shown in FIGS. 2–5, shaft support 20 includes a mounting portion 22 and at least one clamping or securing portion or member 24 adjustably mounted to or attached to mounting portion 22 via at least one fastener 26, such as a threaded bolt or the like. Clamping member 24 is adjustable relative to a shaft or axle 16b of a roller via adjustment of fastener 26 to clamp or urge or press clamping member 24 toward and into engagement with shaft 16b to secure shaft 16b relative to shaft support 20, as shown in FIG. 5 and discussed below. Mounting portion 22 and clamping member 24 may comprise molded plastic components, or may be formed of a metallic material, without affecting the scope of the present invention.

Shaft support 20 may be mountable to the sidewalls so as to position a shaft receiving aperture 28 of mounting portion 22 generally over and aligned with an appropriate one of the hexagonal-shaped apertures in the sidewall of the conveyor. Shaft receiving aperture 28 extends through mounting portion 22 and is configured to receive the axle or shaft 16b of a roller 16 therethrough. Optionally, because the roller shaft is clamped between the mounting portion and the clamping member of the shaft support (as discussed below), the shaft support need not be mounted at or aligned with a shaft opening in the conveyor sidewall. For example, the shaft support may mount to the sidewall and may support the roller shaft above the sidewall, such as for applications where the conveyor sidewalls may not have shaft receiving slots or apertures formed therethrough.

Shaft support 20 is mountable to the sidewall 14 of the conveyor via a mounting fastener or fasteners, such as a threaded bolt or stud 30a and a correspondingly threaded female fastener or nut or sleeve 30b, such as a collapsible threaded fastener that may attach to the side channel. When shaft support 20 is positioned at a sidewall 14 of a conveyor 10, fastener 30a may extend through a generally central aperture 32 in mounting portion 22 and further through an opening in sidewall 14, whereby fastener 30b may be threaded onto fastener 30a to secure mounting portion 22 to sidewall 14 with a sidewall engaging surface 22a of mounting portion 22 abutted against sidewall 14. Mounting portion 22 may be sized such that, when aperture 32 is aligned with the respective mounting opening in the sidewall, the shaft receiving aperture 28 may be positioned generally over and aligned with one of the hexagonal-shaped openings 14a in sidewall 14. The fasteners 30a, 30b thus may secure the shaft support to the sidewall such that the shaft receiving aperture 28 is positioned generally over and aligned with a hexagonal-shaped aperture in the conveyor sidewall.

After the shaft support is mounted to the conveyor sidewall, the roller shaft may be inserted into the shaft support to mount the roller to the conveyor. Optionally, the roller shafts may be inserted into the shaft supports and then the shaft supports may be mounted to the conveyor sidewalls, such as for applications with slots formed in the conveyor sidewalls for receiving the roller shafts or for applications where the shaft supports may support the roller shafts (such as above the sidewalls) without the sidewalls receiving the roller shafts in slots or apertures formed in the sidewalls. It is further envisioned that the rollers and shaft supports may be marketed as a single unit which may be less expensive to manufacture over the prior art and may be easily installed on a conventional roller conveyor. Optionally, a stub axle may be inserted through the shaft support and into an opening or passageway at the end of the roller, as discussed below.

Mounting portion 22 of shaft support 20 includes at least one hexagonal-shaped shaft receiving aperture 28 extending therethrough for receiving a shaft end 16b of roller 16. In the illustrated embodiment, shaft support 20 includes two clamping members 24 and mounting portion 22 includes two shaft receiving apertures 28, such that shaft support 20 may be reversibly positionable at the sidewalls of the conveyor. Shaft support 20 thus may be readily attached or mounted at either side of the conveyor via flipping or turning the shaft support about the center fasteners 30a, 30b to align the desired or appropriate shaft receiving aperture 28 and respective clamping member 24 with the desired or appropriate aperture in the conveyor sidewall. However, the shaft support may include only one shaft receiving aperture, without affecting the scope of the present invention.

Mounting portion 22 includes a base portion 22b extending the length of mounting portion 22 and abutting against the conveyor sidewall when mounting portion 22 is secured to the sidewall. Mounting portion 22 includes a raised portion or boss 34 extending outward from base portion 22b opposite to sidewall engaging surface 22a and a shaft receiving extension 36 spaced from raised portion 34 and also extending outward from base portion 22b, so as to form a generally U-shaped block. Raised center portion 34 may have mounting aperture 32 formed therethrough and includes a ramped surface 34a at a side thereof and generally facing shaft receiving extension 36. Ramped surface 34a is formed at an angle A (FIGS. 4 and 5) relative to a line generally parallel to the longitudinal axis 26a of fasteners 26 to cause lateral movement of clamping member 24 as fastener 26 is tightened, as discussed below. In the illustrated embodiment, mounting portion 22 comprises an elongated member having a generally centrally positioned raised portion 34, with a shaft receiving extension 36 at the opposite ends of the mounting portion 22, so that shaft support 20 may be readily reversed or flipped to adapt the shaft support for holding and supporting a roller shaft at either side of the conveyor.

Figure 2:
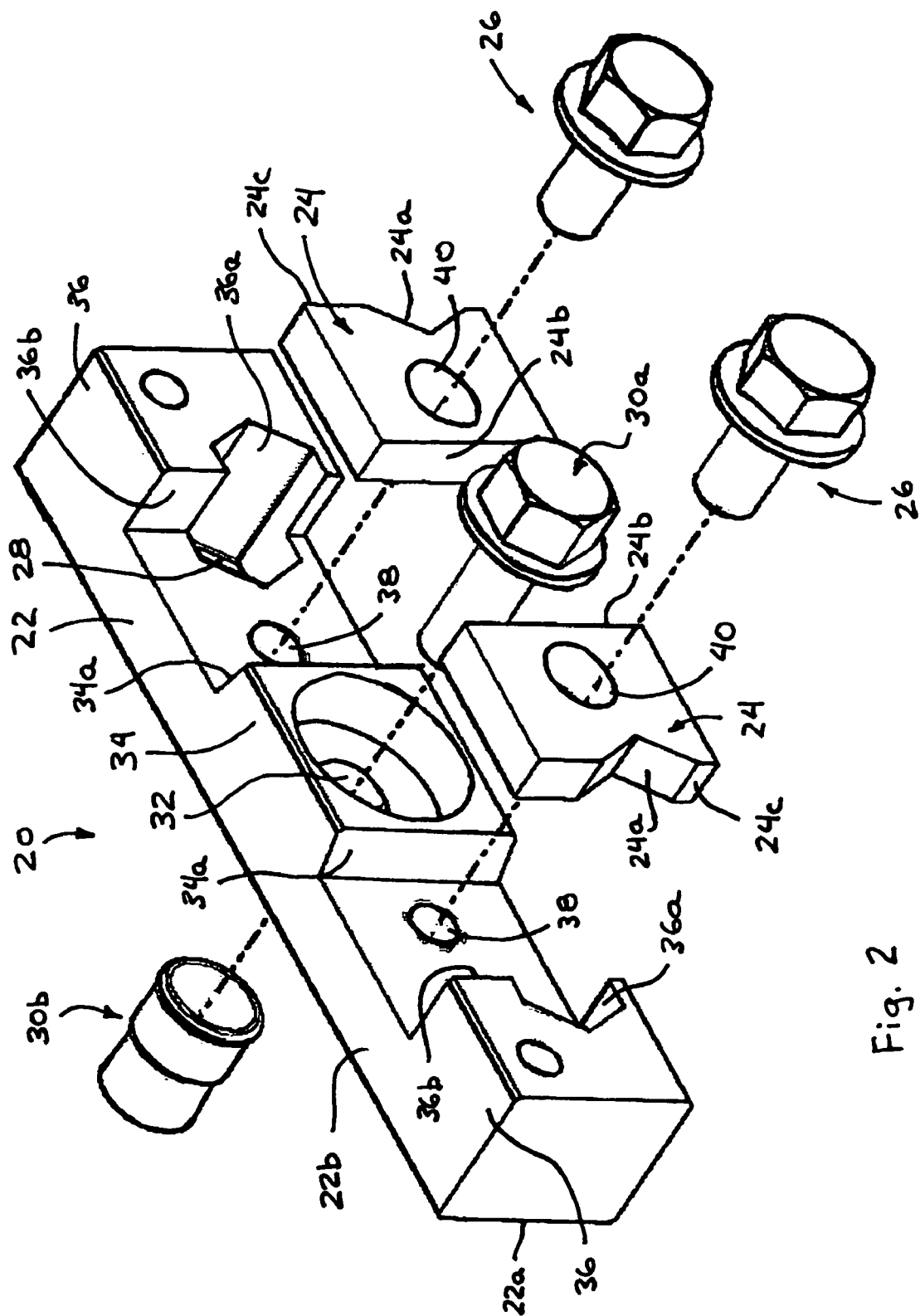
FIG. 2 is an exploded perspective view of a shaft support of the present invention.

Shaft receiving aperture 28 extends through base portion 22b, while a shaft receiving channel 36a extends along shaft receiving extension 36, as best shown in FIGS. 2 and 5. As shown in FIG. 5, an axle or shaft 16b of a roller may be received through base portion 22b and at least partially along the partial hexagonal-shaped channel 36a extending along extension 36. Base portion 22b includes at least one fastener receiving opening or passageway 38, such as a threaded passageway, formed at least partially therethrough, for threadedly receiving fastener 26 to adjustably mount clamping member 24 to mounting portion 22, as discussed below.

Clamping member 24 is a generally flat rectangular-shaped block with a notch or clamping surface 24a formed at one end. The clamping surface 24a is formed to correspond with a side portion or surface of the roller shaft 16b, such that clamping surface 24a and the shaft receiving channel 36a of extension 36 cooperate to form a generally hexagonal-shaped opening or passageway, as can be seen with reference to FIG. 2. The opposite side or surface or ramp engaging surface 24b of clamping member 24 may be a generally flat surface for engaging and sliding along ramped surface 34a of raised portion 34 of mounting portion 22, as discussed below. Clamping member 24 includes a fastener receiving opening or aperture 40 therethrough for inserting fastener 26 through clamping member 24 to adjustably mount or attach or secure clamping member 24 to mounting portion 22 at a fastener receiving opening 38, as also discussed below.

Figure 3:
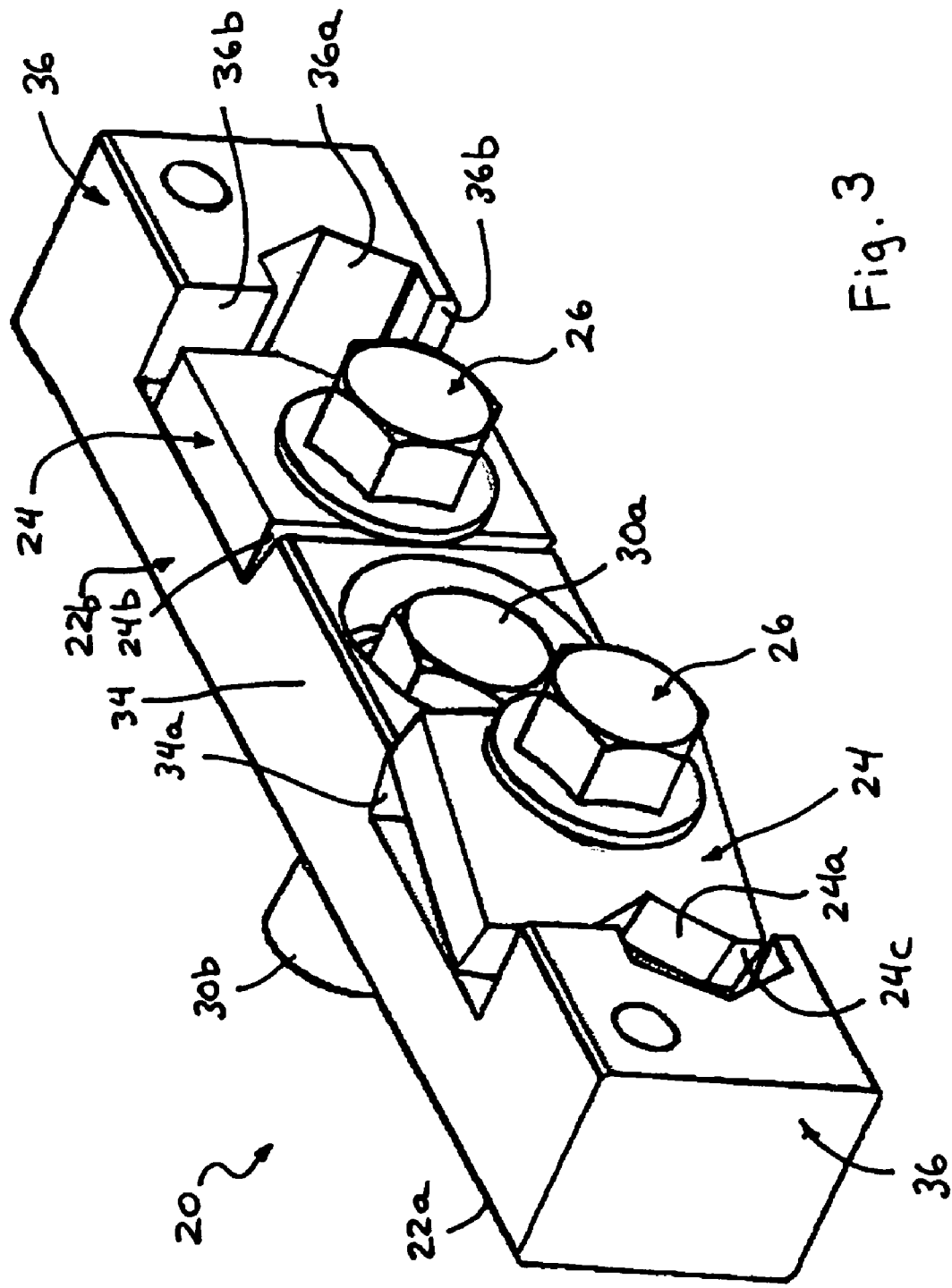
FIG. 3 is a perspective view of the assembled shaft support of FIG. 2.
Figure 4:
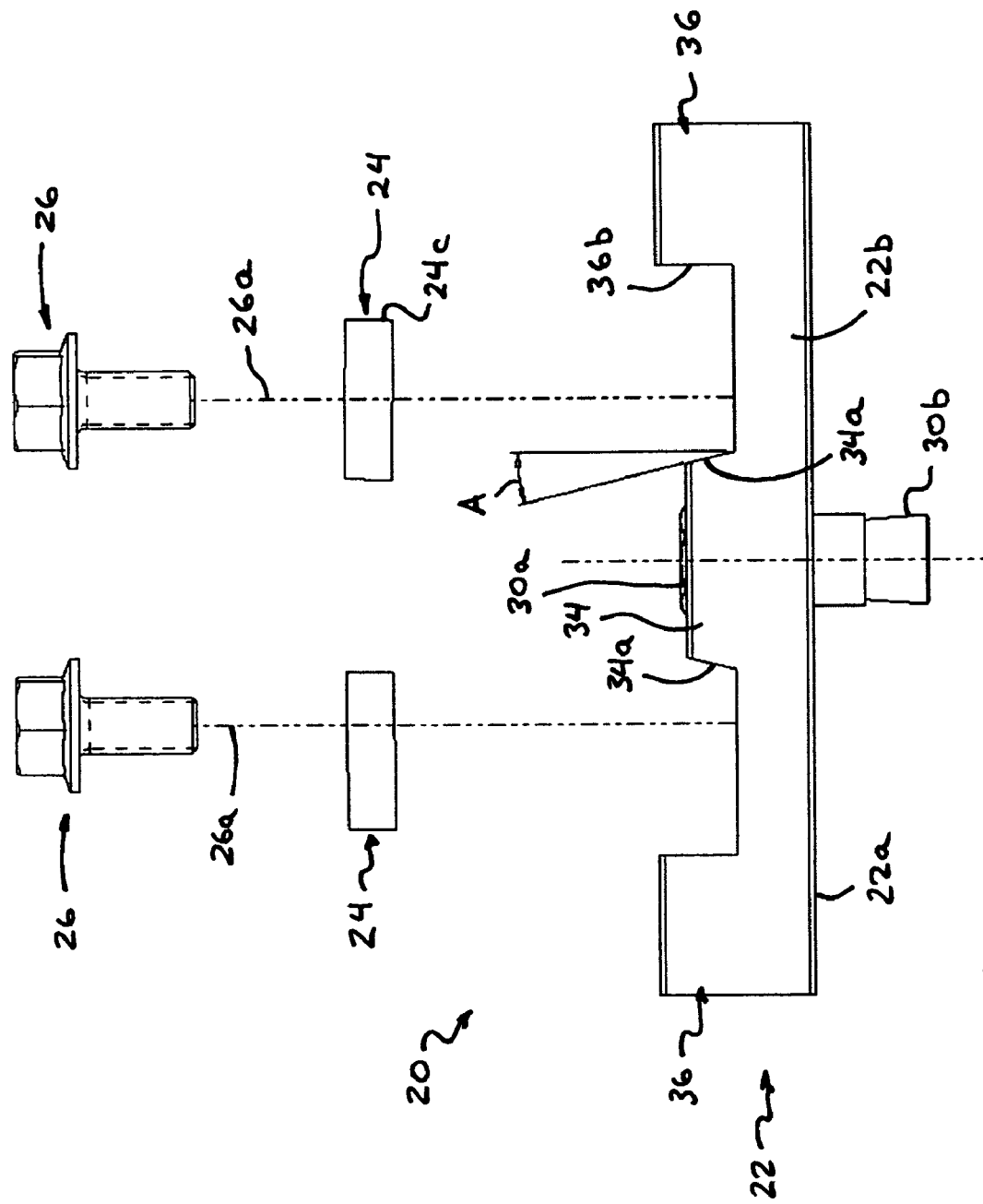
FIG. 4 is an exploded side elevation of the shaft support of the present invention.

When assembled together, fastener 26 of shaft support 20 extends through aperture 40 of clamping member 24 and threadedly engages threaded passageway 38 of mounting portion 22. As best shown in FIGS. 3 and 5, clamping member 24 may be positioned between the roller shaft 16b and ramped surface 34a, such that notch 24a engages and receives a portion of the roller shaft 16b, while ramp engaging surface 24b engages ramped surface 34a. As fastener 26 is tightened within passageway 38, fastener 26 moves clamping member 24 toward base portion 22a of mounting portion 22, which causes ramp engaging surface 24b to move along ramped surface 34a toward base portion 22a. As ramp engaging surface 24b moves along ramped surface 34a, clamping member 24 and clamping surface or notch 24a move toward the roller shaft 16b extending through shaft receiving aperture 28 and along shaft receiving channel 36a. Further tightening of fastener 26 causes further urging or pressing or clamping of clamping surface 24a against shaft 16b to substantially clamp the shaft 16b between clamping surface 24a and shaft receiving channel 36a. Fastener receiving aperture 40 of clamping member 24 thus may be oversized relative to fastener 26, in order to allow lateral movement of clamping member 24 relative to fastener 26 and mounting portion 22 as fastener 26 is tightened and clamping member 24 is moved toward shaft 16b and shaft receiving channel 36a.

The clamping member 24 may be sized so that the sides or edges or surfaces 24c at clamping surface or notch 24a will not abut against the sides or surfaces 36b at either side of shaft receiving channel 36a when clamping member 24 is fully tightened against base portion 22a (as can be seen in FIGS. 3 and 5). The clamping member 24 thus will not be limited in its movement toward the shaft by engagement of the clamping member 24 with the extension 36 and thus may be pressed into tight engagement with the roller shaft 16b, while the shaft is supported and held in place via channel 36a. The notch depth and the channel depth may be selected to define a generally hexagonal opening or passageway (when the clamping member is fully tightened against the mounting member) that is smaller than the roller shaft diameter. The ramped or angled surface thus provides a means for urging the clamping member toward the shaft via tightening the fastener that mounts the clamping member to the mounting portion. The shaft thus may be tightly clamped between the clamping member and the base portion of the shaft support such that the roller shaft is not necessarily clamped or urged against the edges of the aperture in the sidewall, which may reduce or limit wear on the sidewall of the conveyor, while the shaft support tightly secures the roller shaft relative to the conveyor sidewall. The shaft receiving extension 36 is preferably thick enough to limit or substantially preclude a bending moment at the shaft support as the clamping member fastener 26 is tightened and the clamping member is urged into tight engagement with the roller shaft along the shaft receiving channel of the extension.

The ramped surface may be at any angle which is sufficient to move or urge the clamping member a sufficient amount to clamp the shaft within the shaft support, while limiting or substantially avoiding binding of the clamping member along the ramped surface. The angle A (relative to the axis 26a of the fastener 26) of the ramped surface thus should be steep enough or small enough to avoid such binding, while also being large enough to provide the desired or appropriate lateral movement of the clamping member toward the roller shaft and shaft receiving channel. In a preferred embodiment, the angle A may be selected to be between approximately 5 degrees and approximately 25 degrees and, more preferably, between approximately 10 degrees and approximately 20 degrees. In the illustrated embodiment, the angle is approximately 14 degrees. However, any other angle or ramp may be implemented, without affecting the scope of the present invention.

By clamping the shaft end tightly within and along the shaft receiving channel and against the clamping member, the shaft support limits or substantially precludes relative movement of the shaft end of the roller relative to the shaft support and the conveyor sidewall, which reduces the wear of the shaft end and the shaft support, which may otherwise occur via the roller shaft impacting the aperture walls when the roller is started and stopped. Also, if any wear or loosening does occur, the clamping fastener may be further tightened to cause further lateral movement or urging of the clamping member toward the shaft to maintain a tight interference or clamping of the shaft to tightly secure the shaft end of the roller within the shaft support. Because the shaft is secured within the shaft support, wear to the sidewalls of the conveyor is also reduced.

Figure 6:
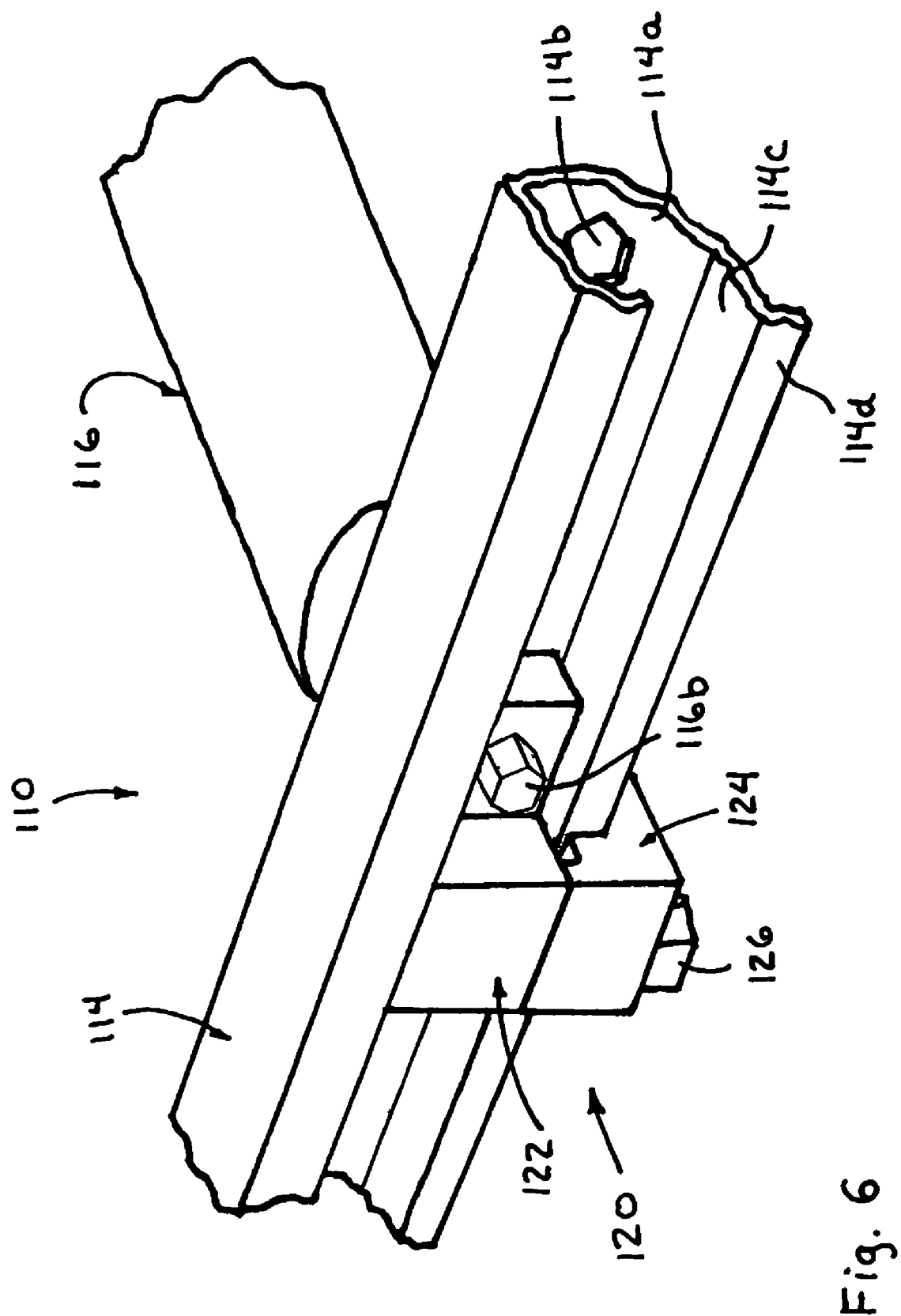
FIG. 6 is a perspective view of another shaft support in accordance with the present invention as mounted at a sidewall of a conveyor.

Referring now to FIGS. 6–15, a shaft support 120 is mounted to the opposite sidewalls 114 of a conveyor 110, whereby the shaft supports 120 function to clamp or otherwise tightly secure the axle or shaft ends 116b of one or more rollers 116 therewithin. As shown in FIG. 6, sidewall 114 of conveyor 110 includes a generally vertically oriented portion 114a with a plurality of hexagonal shaped apertures or openings 114b therethrough for receiving the shaft ends 116b of the rollers 116. The sidewall 114 includes a horizontal lip or flange 114c extending from the vertical portion 114a. The horizontal flange 114c further includes a downward extending lip 114d along an edge of flange 114c opposite vertical portion 114a. The horizontal flange 114c provides a mounting portion for shaft support 120 to mount thereto, as discussed below.

Shaft support 120 includes a shaft receiving portion or clamping or securing portion 122 and a mounting portion 124, which are secured together via a fastener 126, such as a threaded bolt or the like. Shaft support 120 is mountable to the sidewalls so as to position a shaft receiving aperture 122a of shaft receiving portion 122 generally over and aligned with an appropriate one of the hexagonal-shaped apertures in the sidewall of the conveyor. Shaft receiving portion 120 and mounting portion 122 may comprise molded plastic components, or may be formed from a metallic material, without affecting the scope of the present invention.

Figure 12:
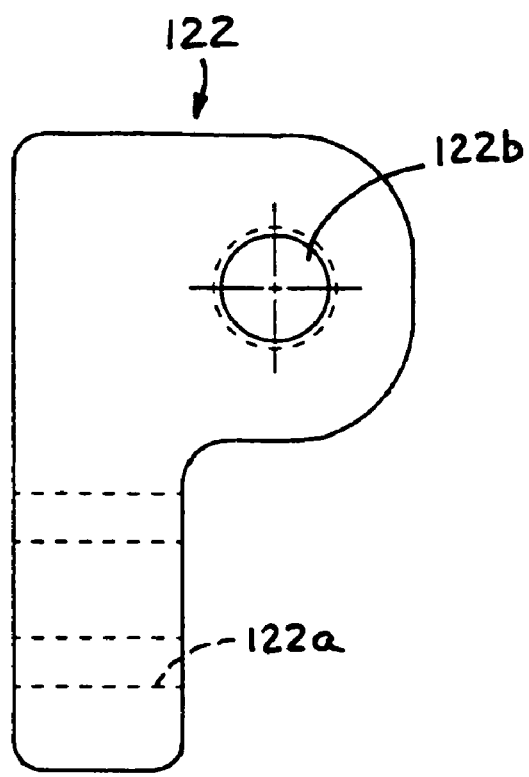
FIG. 12 is a plan view of the clamping portion of FIG. 11.
Figure 11:
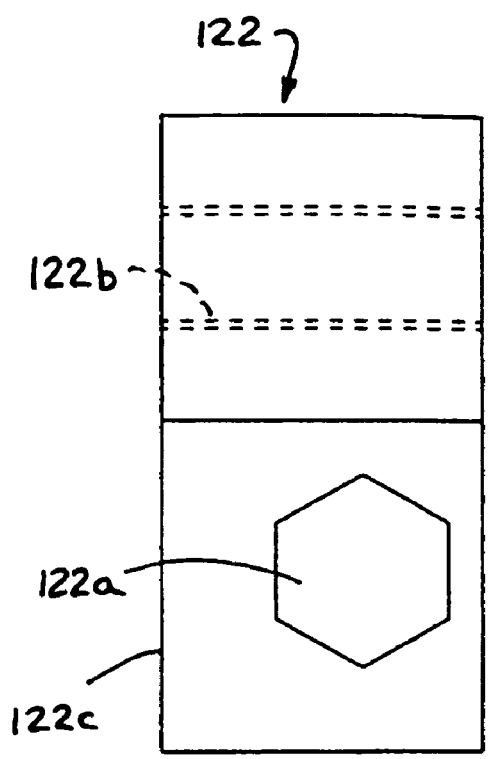
FIG. 11 is a side elevation of a clamping portion of the shaft support of FIGS. 6–10.

Shaft receiving portion 122 of shaft support 120 includes a hexagonal-shaped shaft receiving aperture 122a extending therethrough for receiving a correspondingly formed shaft end 116b of roller 116. Shaft receiving portion 122 also includes a threaded opening or passageway 122b for threadedly receiving fastener 126, as discussed below. With reference to FIGS. 10 and 12, shaft receiving portion 122 comprises a generally L-shaped block which has a lower surface 122c. Shaft receiving portion 122 is secured to mounting portion 124 via tightening of fastener 126, such that lower surface 122c faces or partially engages an upper portion or surface 124a of mounting portion 124, as also discussed below. Preferably, the portion of the L-shaped block through which passageway 122a is formed comprises a substantially thick portion, so as to increase the surface area of the shaft support which engages the shaft of the roller.

Mounting portion 124 of shaft support 120 includes a generally cylindrical passageway 124b therethrough for receiving fastener 126. Upper portion 124a of mounting portion 124 includes a stepped or raised ridge 124c extending therealong. Mounting portion 124 also includes a mounting hook or recessed region 124d at an opposite end of ridge 124c. The recessed region 124d is defined by an upwardly extending lip or hook 124e. Recessed region 124d is formed to receive downward extending lip 114d of sidewall 114 when shaft support 120 is mounted to sidewall 114 of conveyor 110, as discussed below.

Figure 7:
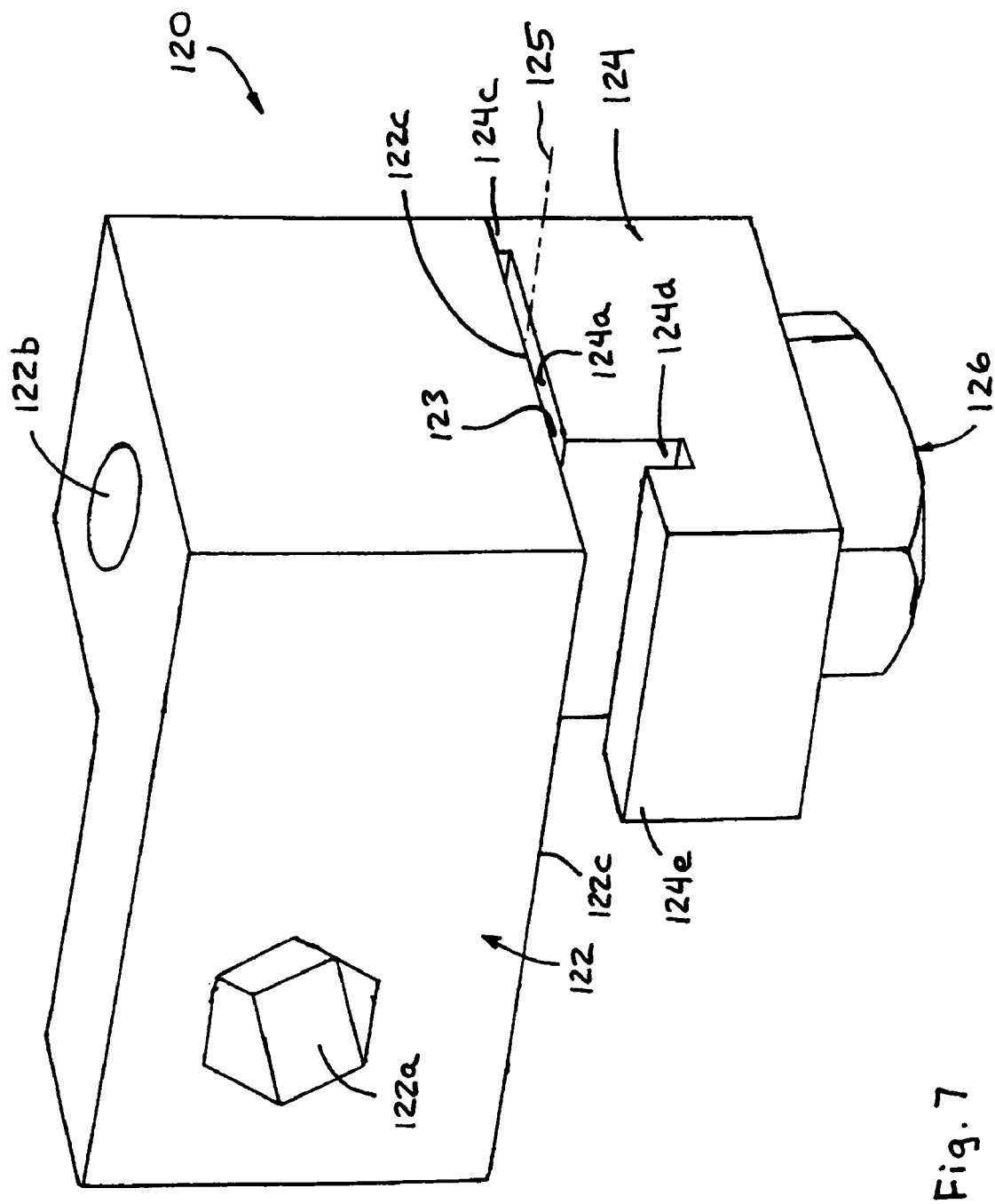
FIG. 7 is a perspective view of the shaft support of FIG. 6.

When assembled together, fastener 126 of shaft support 120 extends through passageway 124b of mounting portion 124 and threadedly engages threaded passageway 122b of shaft receiving portion 122. As best shown in FIGS. 7 and 8, ridge 124c of mounting portion 124 causes a gap 123 to exist between lower surface 122c of shaft receiving portion 122 and upper surface 124a of mounting portion 124. As fastener 126 is tightened within passageway 122b, fastener 126 causes shaft receiving portion 122 to twist to at least partially close the gap 123 between shaft receiving portion 122 and mounting portion 124.

When mounted to a sidewall 114 of conveyor 110, shaft support 120 receives horizontal flange 114c between lower surface 122c of shaft receiving portion 122 and lip or hook 124e of mounting portion 124, with downward extending lip 114d being received within and along recessed portion 124d. Lower surface 122c of shaft receiving portion 122 is positioned generally above horizontal flange 114c, as can be seen in FIG. 6. Shaft support 120 is positioned along sidewall 114 to align hexagonal passageway 122a with an appropriate one of the hexagonal apertures 114b of sidewall 114. A shaft end 116b of a roller 116 is received through aperture 114b and at least partially through passageway 122a of shaft support 120. As fastener 126 is tightened, shaft receiving portion 122 twists or pivots toward mounting portion 124 to at least partially close gap 123, and thus causes aperture 122a to become misaligned with the shaft end of the roller, thereby clamping the shaft end within the passageway 122a of shaft support 120 and pushing or urging the shaft against the sides of the corresponding aperture 14b in the sidewall 114. In the illustrated embodiment, shaft receiving portion 122 is pivotable relative to mounting portion 124 about an axis of rotation 125 (FIG. 7) which is generally normal to a longitudinal axis of the roller shaft.

By clamping the shaft end tightly within passageway 122a and against the sides of the aperture 114b, shaft support 120 limits or substantially precludes relative movement of the shaft end of the roller relative to shaft support 120 and conveyor sidewall 114, which reduces the wear of the shaft end and the shaft support, which may otherwise occur via the roller shaft impacting the aperture walls when the roller is started and stopped. Also, if any wear or loosening does occur, fastener 126 may be further tightened to cause further twisting of shaft receiving portion 122 to maintain a tight interference or clamping of the shaft to tightly secure the shaft end of the roller within passageway 122a and aperture 114b.

Optionally, the shaft support of the present invention may be mounted to the sidewall of the conveyor via a mounting flange or clip that may be tightened (such as via a bolt and nut or the like) to clamp the shaft support to the downward extending lip of sidewall, without affecting the scope of the present invention. When installed at the sidewall of the conveyor, the flange of the shaft receiving portion may engage one side of the downward extending lip of the sidewall, while the mounting portion engages the other side, such that tightening of the fastener generally clamps the lip between the mounting portion and the flange. When positioned at the sidewall, the shaft receiving portion may generally abut against the vertical wall portion while a gap may exist between the mounting flange and the lip. Further tightening of the fastener causes twisting of the shaft receiving portion as the flange is drawn toward the lip and/or the mounting portion beneath the lip to partially close the gap between the flange and the lip and/or the mounting portion. The twisting of the shaft receiving portion thus causes tightening or clamping of the roller shaft end within the passageway and pressing of the shaft against the sides of the corresponding aperture in the conveyor sidewall in a similar manner as discussed above with respect to shaft support 120.

Optionally, the shaft support of the present invention may include a shaft receiving portion that is formed or shaped to loosely receive the horizontal flange and the lip of the sidewall within a recess or groove in the shaft receiving portion. A pair of fasteners or bolts may extend through a lower flange of the shaft receiving portion and may be tightened to cause flexing or twisting of the shaft support relative to the shaft end of the roller, in order to clamp the roller shaft within the passageway and against the sides of the corresponding aperture of the conveyor sidewall in a similar manner as discussed above.

Figure 16:
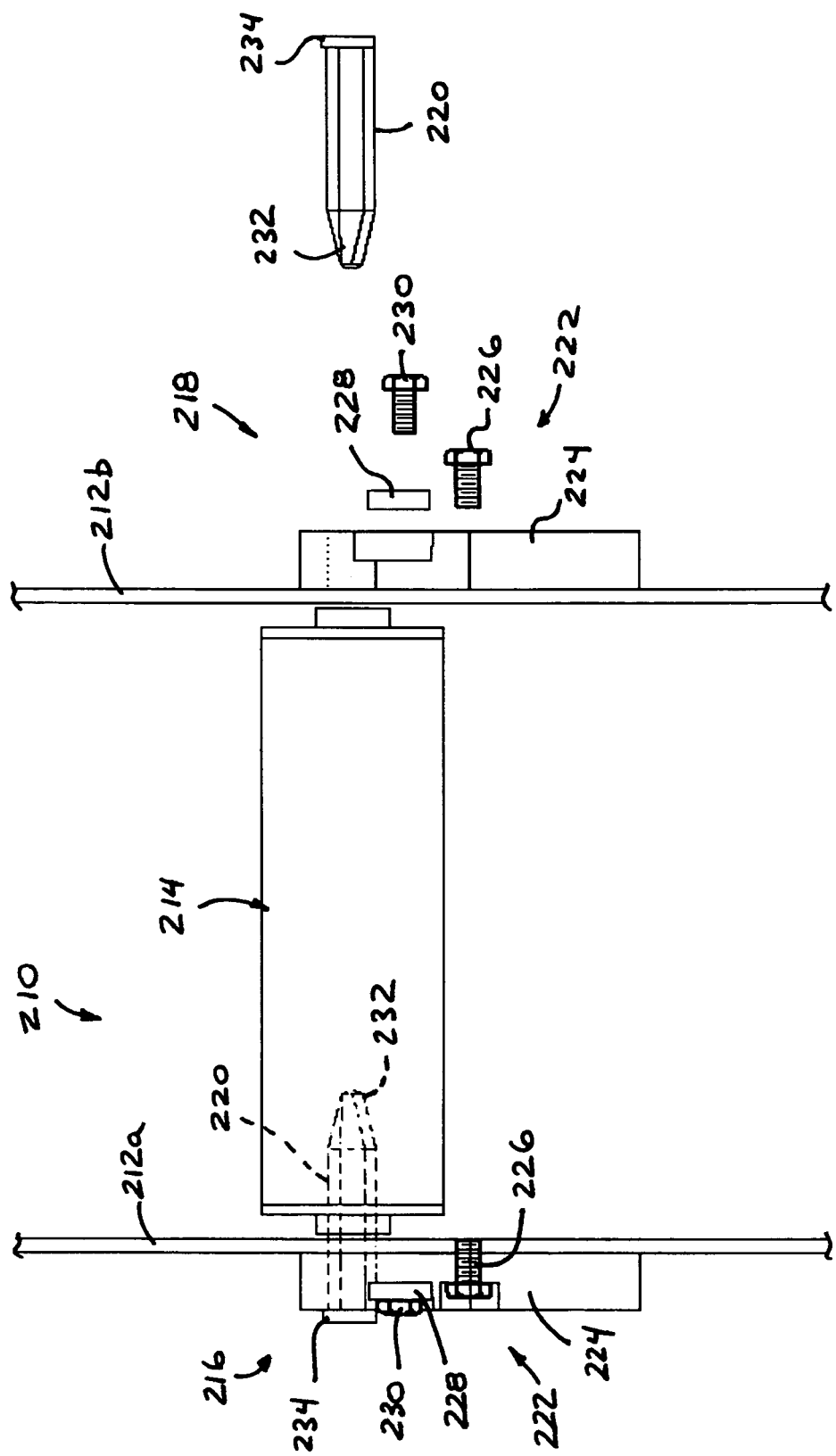
FIG. 16 is a top plan view of another conveyor system in accordance with the present invention, with a cantilevered axle support assembly at each end of a roller.
Figure 17:
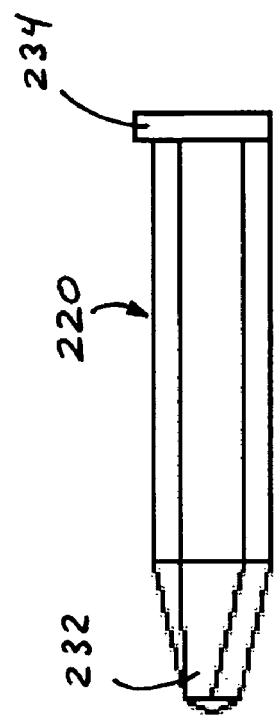
FIG. 17 is an enlarged plan view of a stub axle useful with the cantilevered axle support assembly of the present invention.

Referring now to FIGS. 16–20, a conveyor system 210 includes a pair of sidewalls or side channels or frame members 212a and 212b and a plurality of rollers 214 supported by the side channels. The rollers 214, only one of which is illustrated in FIG. 16, may include a plurality of motorized rollers and a plurality of slave rollers that are driven by the motorized rollers, such as via O-rings or the like. The self-driven or motorized roller may comprise a motorized roller which has an internal motor within the roller that functions to rotate an outer cylindrical portion relative to the shaft portion, such as, for example, motorized rollers of the types described above. Likewise, the conveyor or conveyor section or zone may comprise various types of conveyors or sections or zones, such as described above.

Roller 214 is supported at one or both ends by a cantilevered axle assembly. In the illustrated embodiment, roller 214 is supported at one end by a first cantilevered axle assembly 216 and at the opposite end by a second cantilevered axle assembly 218. Each cantilevered axle assembly 216, 218 is generally fixed to the respective side channel and includes a stub axle or axle portion 220 that penetrates through an opening in a sidewall or side channel 212a, 212b and partially into a respective passageway or opening 214a (FIG. 20) of the shaft portion or non-rotatable portion 214b of roller 214 in a manner that prevents the non-rotatable portion 214b of the roller 214 surrounding opening 214a from rotating relative to the side channel. The cross sectional shape of the stub axle 220 generally corresponds to the shape of the opening in the side channel and in the passageway or opening in the roller, such that the stub axle 220 is non-rotatably received through or within the respective openings. Because each axle assembly 216, 218 is connected with the respective side channel, roller 214 is supported in a cantilevered fashion. As would be understood by the skilled artisan, the rotor of a motor internal to a motorized roller (such as in applications where roller 214 is a motorized roller) is prevented from rotation by at least one of the axle assemblies 216, 218, and the stator of the motor rotates relative to the rotor thereby rotating the outer shell 214c of roller 214 about the non-rotatable or shaft portion 214b.

Cantilevered axle assembly 216, 218 includes a shaft support, such as a roller shaft mount 222, such as a shaft support similar to shaft support 20, described in detail above. Shaft mount 222 includes a mounting portion 224 that is secured to the respective side channel by one or more fasteners 226. Shaft mount 222 further includes a clamping member 228 that is fastened to mounting portion 224 by a fastener 230. As described above, the tightening of fastener 230, causes a clamping force between clamping member 228 and mounting portion 224 that secures the respective stub axle 220 relative to the mounting portion and clamping member and thus relative to the respective side channel 212a, 212b. While the invention is illustrated with a clamping member as described above, it should be understood that other mechanisms or mounting arrangements could be used to connect stub axle 220 to the side channel, such as a clamping or mounting device similar to shaft support 120, described above, and/or such as including making the cantilevered axle assembly 216, 218 as a one-piece member, without affecting the scope of the present invention.

Figure 18:
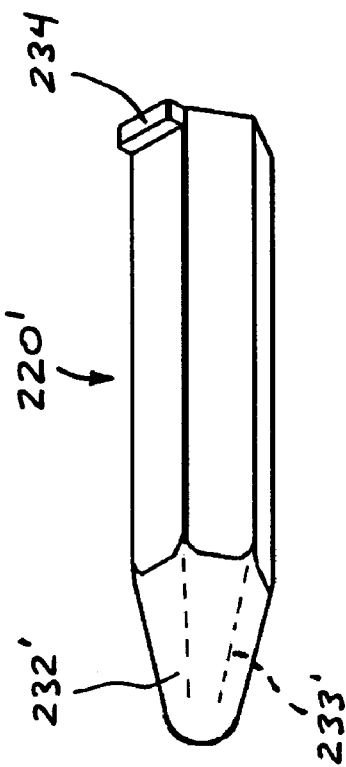
FIG. 18 is an enlarged perspective view of another stub axle useful with cantilevered axle support assembly of the present invention.
Figure 19:
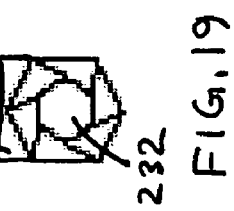
FIG. 19 is an end elevation of the stub axle taken from the direction A in FIG. 17.
Figure 20:
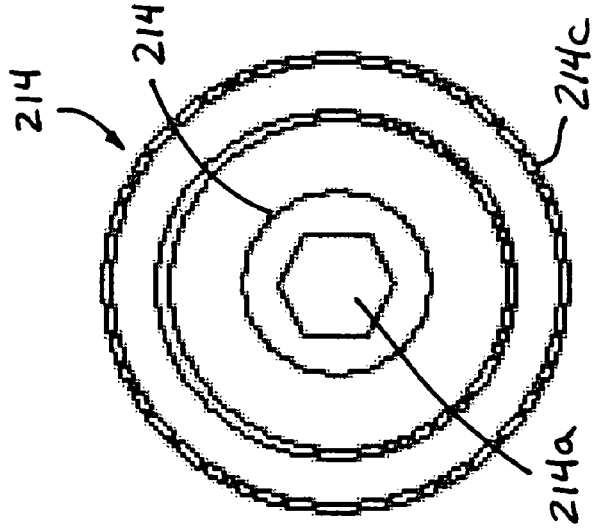
FIG. 20 is an end elevation of a roller useful with the cantilevered axle support assembly of the present invention.

Stub axle 220 has a cross section that corresponds with that of opening 214a in shaft portion 214b of roller 214 in order to prevent the rotor of the internal motor from rotating relative to stub axle 220. Stub axle 220 may include an inner end portion or tip 232 that is inclined or ramped in order to more readily mate with opening 214a. End portion 232 may also be configured to more readily align the stub shaft with opening 214a, such as by utilizing the principles disclosed in commonly assigned U.S. Pat. No. 6,782,996 entitled AXLE CARTRIDGE FOR CONVEYOR ROLLER, the disclosure of which is hereby incorporated herein by reference. Optionally, and as shown in FIG. 18, the tip 232' may comprise a conical-shaped tip at the inner end of the stub axle 220', and may have a tapered rounded hexagonal shape at the tip (where the edges of the hexagonal shape may be blended or rounded edges 233' at the tip 232' so as to form a generally conical-shaped tapered tip). The stub axle also has an enlarged outer end or tab 234 at the end opposite to inner end 232. Tab 234 limits inward movement or insertion of the stub axle relative to the shaft support, as discussed below. Stub axles 220 of cantilevered axle assemblies 216, 218 may be made of any suitable material, such as steel, structural plastic, aluminum or the like.

The roller 214 thus may be readily installed at and between the side channels 212a, 212b by positioning the roller at the desired location between the side channels and with the openings or passageways 214a at one or both ends of the roller in general alignment with the respective openings or apertures in the side channels 212a, 212b. The mounting portions 224 of axle supports 222 may be secured to the side channels via fasteners 226 and with the opening or aperture through the mounting portion also being in general alignment with the opening in the side channel (optionally, the side channel may not include a correspondingly formed opening, whereby the opening in the roller is positioned in general alignment with the opening in the mounting portion). When the roller is positioned in general alignment with the mounting portions, the stub axles 220 may be inserted through the aperture in the respective mounting portion and through the respective side channel and at least partially into the passageway or opening 214a in the shaft portion 214b at the respective end of the roller 214 so as to at least partially penetrate the passageway or opening in the roller. When so inserted and positioned, the clamping member 228 may be clamped against the stub axle via tightening of the fastener 230 to secure the respective stub axle relative to the shaft support 220 and side channel 212a, 212b.

The stub axle thus is at least partially inserted into the end of the roller and is supported and secured at the side channel, such that the stub axle functions to cantileverly support the respective end of the roller at the side channel. The stub axle is inserted into the roller end until the outer end tab 234 of stub axle 220 contacts the mounting portion 224 of the axle support 222 to limit further insertion of the stub axle. The length of the stub axle may be selected so that when the stub axle is so inserted, the axle extends sufficiently into the roller to support the roller end at the side channel. The clamping member 228 may then be tightened against the mounting portion 224 and slid along the ramped portion of the mounting portion via tightening of fastener 230 to substantially engage the shaft portion of the stub axle and to substantially clamp the stub axle between the clamping member 228 and the mounting portion 224.

The cantilever axle support assembly thus provides cantilever support of the roller ends at and between the side channels of the conveyor. The roller may be readily lowered (or raised) into general alignment with the shaft support (and/or with apertures in the side channels), whereby the stub axle may or axles may be inserted through the shaft support and/or side channel and at least partially into the opening or passageway at the end of the roller. The tab at the outer end of the stub axle limits insertion of the stub axle into the passageway of the roller by engaging the shaft support (or engaging the sidewall or side channel of the conveyor or other mounting structure or arrangement at the sidewall of the conveyor) when the stub axle is inserted through the shaft support and/or side channel and/or other mounting structure and at least partially into the passageway at the end of the roller. The roller thus is substantially secured to the side channels so that the shaft portions and stub axles are non-rotatably secured to the side channels, while the roller portion may rotate about the shaft portions and stub axles. Because the cantilevered stub axles are received within the passageways at the end or ends of the roller, the roller may move along the cantilevered stub axles and thus may generally "float" between the sidewalls when supported by the cantilevered stub axle at both ends of the roller. When it is desired to remove the roller, the shaft support may be loosened and the stub axle may be retracted from the roller end so that the roller may be readily raised (or lowered or otherwise moved) from between the side channels.

Although shown with a cantilevered axle assembly at each sidewall, it is envisioned that one end of the roller may include an axle portion extending therefrom, while the other end may receive the stub axle of a cantilevered axle assembly, whereby the axle portion of the one end may be inserted into the sidewall opening and/or the opening in the shaft support, and the roller may then pivot until an opening in the other end is generally aligned with an opening in the opposite sidewall and/or shaft support, whereby a stub axle may be inserted through the shaft support and/or sidewall and into the opening in the end of the roller. For example, a motorized roller may include a motor cartridge, with an axle portion (such as a substantially fixed axle portion that is at a generally fixed length or degree of extension from the motor cartridge) protruding outwardly therefrom, at one end of the roller and may include an idler cartridge at the other end of the roller, whereby the idler cartridge may include a passageway for receiving a stub axle of a cantilevered axle assembly. Optionally, one of the cartridges may include a braking mechanism (such as described in U.S. patent application Ser. No. 10/993,301, filed Nov. 19, 2004 by Haan etal. for CONVEYOR ROLLER WITH BRAKE, now U.S. Pat. No. 7,021,456, which is hereby incorporated herein by reference), which has an axle portion extending therefrom, and the cantilevered axle assembly may be at the end of the roller opposite from the braking cartridge. For an idler roller with no motor cartridge or braking cartridge, the shaft portions or cartridges may receive a stub axle of a cantilevered axle assembly at either or both ends. Other configurations of stub axles and axle cartridges and the like may be implemented, without affecting the scope of the present invention.

Therefore, the present invention provides a shaft support which non-rotatably secures or clamps the shaft portions of a driven or non-driven roller. The shaft support may be implemented with a conventional roller having a spring-loaded shaft, or may be implemented with the other rollers which do not include spring-loaded shafts, but which may be loosely inserted through the openings in the conveyor sidewalls and then clamped within the shaft supports and openings, or that may be inserted through the sidewalls and into correspondingly formed openings in the ends of the rollers. Preferably, the thickness of the shaft receiving portion of the shaft support is substantially thick or deep enough to provide an increased surface area for engagement with and along the roller shaft to enhance clamping of the shaft by the shaft support.

Furthermore, the shaft support may be implemented on a conventional pre-punched sidewall, side channel or frame or bracket of the conveyor, with minimal adaptation required. The shaft support may receive the shaft end of a roller (such as a motorized roller or idler or slave roller) through a correspondingly shaped passageway, and substantially preclude relative rotation therebetween, while resisting wear and corrosion and the like of either the shaft portion or the shaft support. Although the shaft support is particularly suited for implementation with a driven or motorized roller, clearly the scope of the present invention includes implementing the shaft support with non-driven or slave rollers as well. An additional benefit of the present invention is that the design of the shaft support is simple, such that the supports can be easily maintained or replaced. The present invention thus provides a roller and shaft support which is easier to install on and remove from a roller conveyor sidewall. It is further envisioned that the rollers and shaft supports may be marketed as a single unit which may be less expensive to manufacture over the prior art and may be easily installed on a conventional roller conveyor.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property right or privilege is claimed are defined as follows:

1. A roller shaft support for securing an end of a conveyor roller, the conveyor roller extending laterally across a conveyor having opposite sidewalls extending generally along a direction of conveyance, said roller shaft support comprising:
   a mounting portion mountable to a sidewall of the conveyor; and
   a clamping portion, said clamping portion being movably attached to said mounting portion and movable relative thereto, said shaft support receiving a roller shaft at least partially therethrough, said clamping portion being movable relative to said mounting portion so as to clamp the roller shaft within said shaft support and between said clamping portion and said mounting portion; and
   an adjusting element adjustable to move said clamping portion relative to said mounting portion, said clamping portion being configured to increase a clamping force at the roller shaft as said clamping portion is moved relative to said mounting portion in response to adjustment of said adjusting element, said adjusting element comprising a fastener connecting said mounting portion to said clamping portion, said clamping portion being movable in response to adjustment of said fastener to increase said clamping force at the roller shaft, wherein said clamping portion moves along a ramped surface of said mounting portion and moves toward and into engagement with the shaft of the roller in response to adjustment of said fastener to clamp the roller shaft within said shaft support, said clamping portion increasing said clamping force at the roller shaft as said clamping portion is moved along said ramped surface in response to adjustment of said fastener.

2. The roller shaft support of claim 1, wherein said roller shaft support is adapted for securing a shaft end of a self-driven motorized roller that is operable to rotatably drive a roller portion of the motorized roller relative to the shaft of the motorized roller.

3. The roller shaft support of claim 1, wherein said clamping portion is pivoted relative to said mounting portion in response to adjustment of said fastener to clamp the roller shaft within said roller shaft support.

4. The roller shaft support of claim 1, wherein said ramped surface is at an angle between approximately ten degrees and approximately twenty degrees from an axis of the roller shaft when the roller shaft is received within said shaft support.

5. The roller shaft support of claim 1, wherein said mounting portion includes a shaft receiving aperture therethrough fin receiving the roller shaft, said clamping portion being shaped to correspond to a portion of said shaft receiving aperture to engage a portion of the roller shaft that protrudes from said shaft receiving aperture.

6. The roller shaft support of claim 1, wherein said roller shaft support receives a stub axle that is inserted through said mounting portion and into an opening at the end of the roller.

7. A roller conveyor comprising:
   a pair of opposite sidewalls defining shaft openings;
   at least one roller, said roller comprising a generally cylindrical roller surface that rotates relative to an axle portion; and
   at least one shaft support configured to mount to at least one of said sidewalls said shaft support comprising a mounting portion and a clamping portion and being configured to receive said axle portion of said roller to mount and secure said axle portion of said roller to one of said sidewalls, said mounting portion being mounted to said sidewall and said clamping portion being movable relative to said mounting portion, said at least one shaft support further comprising an adjusting element that is adjustable to move said clamping portion relative to said mounting portion to increase a clamping force at said axle portion to clamp said axle portion within said shaft support to substantially preclude rotation of said axle portion relative to said shaft support, said adjusting clement of said shaft support comprising a fastener connecting said mounting portion to said shaft clamping portion, said clamping portion being movable relative to said mounting portion to increase said clamping force in response to adjustment of said fastener to clamp said axle portion within said shaft support, wherein said clamping portion moves along a ramped surface of said mounting portion and moves toward and into engagement with said axle portion of said roller in response to adjustment of said fastener to clamp the axle portion within said shaft support.

8. The roller conveyor of claim 7, wherein said shaft support is positioned adjacent to one of said shaft openings in said sidewall, said axle portion inserting through said shaft opening in said sidewall and at least partially through a passageway at least partially through said shaft support.

9. The roller conveyor of claim 8, wherein said axle portion is retained within said roller and extends from an end of said roller.

10. The roller conveyor of claim 7, wherein said axle portion extends through said shaft support and through said sidewall and at least partially into a passageway at the end of said roller.

11. The roller conveyor of claim 10, wherein said axle portion includes a narrowed tip for insertion into said passageway at the end of said roller.

12. The roller conveyor of claim 7, wherein said roller comprises a self-driven motorized roller operable to rotate said roller surface relative to said axle portion.

13. A method of securing a shaft of a roller to a sidewall of a conveyor, said method comprising:

providing a conveyor section having opposite sidewalls;

providing a shaft support having a mounting portion and a clamping portion;

mounting said mounting portion of said shaft support at a sidewall of the conveyor;

inserting a shaft of a roller at least partially through a shaft receiving aperture of said shaft support; and moving said clamping portion relative to said mounting portion to increase a clamping force at the shaft of the roller to clamp the shaft in said shaft receiving aperture, wherein moving said clamping portion comprises moving said clamping portion along a ramped surface of said mounting portion to move said clamping portion toward and into engagement with the roller shaft.

14. The method of claim 13, wherein moving said clamping portion comprises moving said clamping portion via adjusting a fastener of said shaft support.

15. The method of claim 13, wherein inserting a shaft of a roller comprises inserting a shaft portion of the roller that protrudes from said roller.

16. The method of claim 13, wherein inserting a shaft of a roller comprises inserting a stub axle through said sidewall and said shaft support and at least partially into a passageway at an end of said roller.

17. A roller shaft support for securing an end of a conveyor roller, the conveyor roller extending laterally across a conveyor having opposite sidewalls extending generally along a direction of conveyance, said roller shaft support comprising:

a mounting portion mountable to a sidewall of the conveyor;

a clamping portion, said clamping portion being movably attached to said mounting portion and movable relative thereto, said shaft support receiving a roller shaft at least partially therethrough, at least one of said clamping portion and said mounting portion having a ramped surface;

an adjusting element adjustable to move said clamping portion relative to said mounting portion; and wherein said clamping portion is movable relative to said mounting portion and along said ramped surface so as to move toward and into engagement with the roller shaft to clamp the roller shaft between said clamping portion and said mounting portion, said clamping portion being configured to increase a clamping force at the roller shaft as said clamping portion is moved relative to said mounting portion and along said ramped surface in response to adjustment of said adjusting element.

18. The roller shaft support of claim 17, wherein said ramped surface is at an angle between approximately ten degrees and approximately twenty degrees from an axis of the roller shaft when the roller shaft is received within said shaft support.

19. The roller shaft support of claim 17, wherein said mounting portion includes a shaft receiving aperture therethrough for receiving the roller shaft, said clamping portion being shaped to correspond to a portion of said shaft receiving aperture to engage a portion of the roller shaft that protrudes from said shaft receiving aperture.

20. The roller shaft support of claim 17, wherein said roller shaft support receives a stub axle that is inserted through said mounting portion and into an opening at the end of the roller.

21. The roller shaft support of claim 17, wherein said roller shaft support is adapted for securing a shaft end of a self-driven motorized roller that is operable to rotatably drive a roller portion of the motorized roller relative to the shaft of the motorized roller.

* * * * *

UNITED STATES PATENT AND TRADEMARK OFFICE
CERTIFICATE OF CORRECTION

PATENT NO. : 7,243,784 B2 Page 1 of 1
APPLICATION NO. : 11/159796
DATED : July 17, 2007
INVENTOR(S) : David H. Cotter et al.

It is certified that error appears in the above-identified patent and that said Letters Patent is hereby corrected as shown below:

Column 15
Claim 1, Line 55, "clamning" should be --clamping-- (second instance)

Column 16
Claim 5, Line 15, "fin" should be --for--
Claim 7, Line 42, "clement" should be --element--

Signed and Sealed this

Twentieth Day of January, 2009

JON W. DUDAS
*Director of the United States Patent and Trademark Office*